US008549605B2

(12) United States Patent
Patil et al.

(10) Patent No.: US 8,549,605 B2
(45) Date of Patent: Oct. 1, 2013

(54) SYSTEM AND METHOD FOR AUTOMATICALLY ESTABLISHING NEW SESSION WITH INTERACTIVE SERVICE AFTER PREVIOUS SESSION EXPIRATION

(75) Inventors: Abhishek Patil, San Diego, CA (US); Dipendu Saha, San Diego, CA (US); Meeta Jain, San Diego, CA (US)

(73) Assignee: Sony Corporation, Tokyo (JP)

( * ) Notice: Subject to any disclaimer, the term of this patent is extended or adjusted under 35 U.S.C. 154(b) by 157 days.

(21) Appl. No.: 13/189,404

(22) Filed: Jul. 22, 2011

(65) Prior Publication Data

US 2013/0024927 A1 Jan. 24, 2013

(51) Int. Cl.
*G06F 15/16* (2006.01)
*G06F 17/30* (2006.01)
*H04L 29/06* (2006.01)
*H04L 9/32* (2006.01)
*H04L 9/08* (2006.01)

(52) U.S. Cl.
USPC ...... 726/9; 726/8; 726/28; 713/155; 713/168; 380/282; 709/228

(58) Field of Classification Search
USPC ......... 713/168–174, 182–186, 202; 709/225, 709/229; 726/2–8
See application file for complete search history.

(56) References Cited

U.S. PATENT DOCUMENTS

| 6,226,752 | B1 | 5/2001 | Gupta et al. | |
|---|---|---|---|---|
| 7,689,697 | B2 | 3/2010 | Chiba | |
| 2006/0075110 | A1 | 4/2006 | Seraphin | |
| 2008/0155109 | A1* | 6/2008 | Khedouri et al. | 709/229 |
| 2010/0150320 | A1 | 6/2010 | Lingafelt et al. | |
| 2011/0010539 | A1* | 1/2011 | Salomone | 713/155 |
| 2012/0008786 | A1* | 1/2012 | Cronk et al. | 380/282 |

FOREIGN PATENT DOCUMENTS

WO 2007096249 8/2007

* cited by examiner

*Primary Examiner* — Evans Desrosiers
(74) *Attorney, Agent, or Firm* — John L. Rogitz

(57) ABSTRACT

A system includes a video display and a processor controlling the display. The processor accesses computer readable instructions to cause the processor to access a server associated with the service over a network responsive to viewer selection of a service. The processor then, without any viewer interaction, executes authentication with the server. Thereafter, responsive to successful authentication, the processor provides the service to a viewer at least in part by presenting an image associated with the service on the display. Responsive to the server indicating that a session for which the authentication is valid is expired, the processor automatically and without viewer input executes authentication with the server to establish a new session.

16 Claims, 4 Drawing Sheets

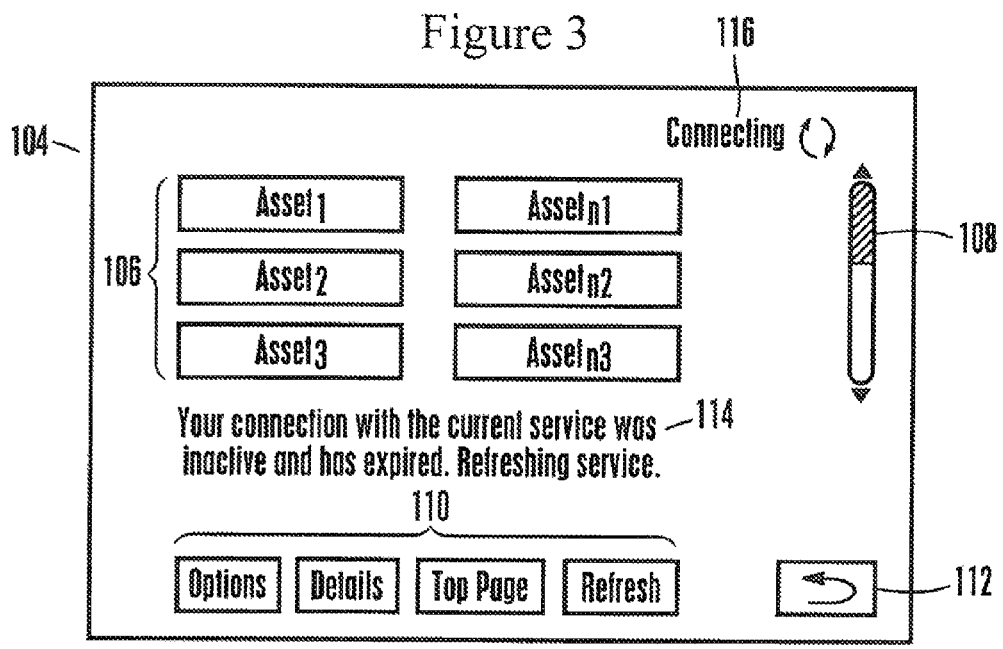
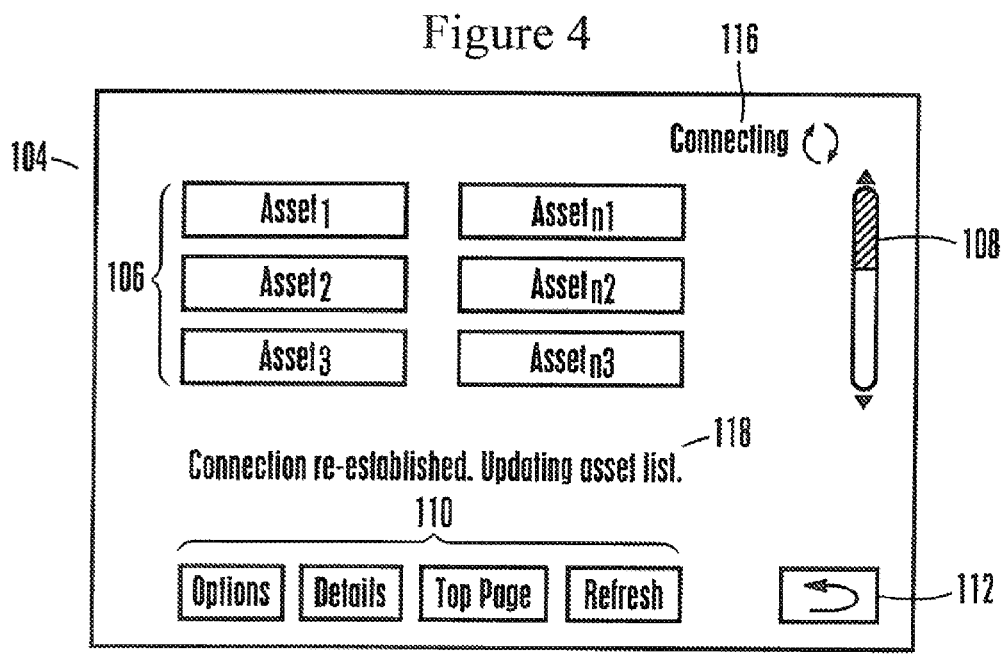

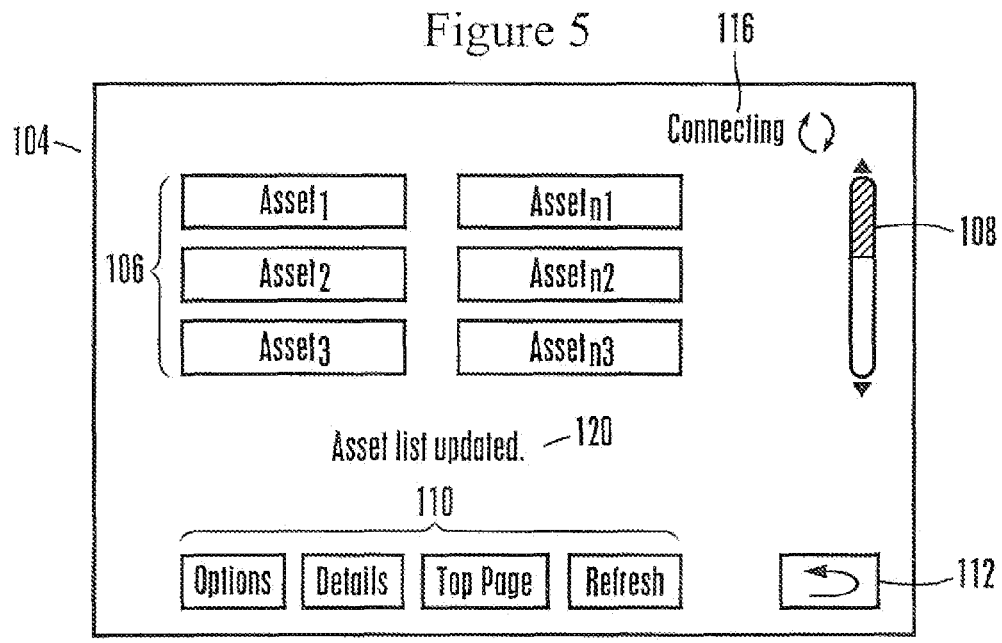
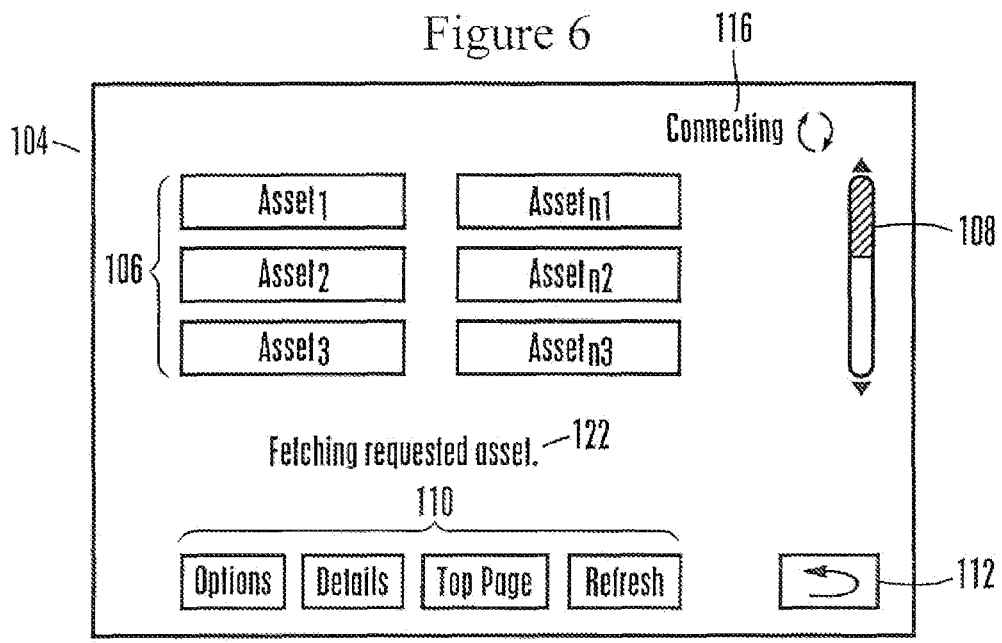

SYSTEM AND METHOD FOR AUTOMATICALLY ESTABLISHING NEW SESSION WITH INTERACTIVE SERVICE AFTER PREVIOUS SESSION EXPIRATION

FIELD OF THE INVENTION

The present application relates generally to consumer electronics devices that connect to network services and require authentication.

BACKGROUND OF THE INVENTION

As understood herein, televisions (TVs) and other consumer electronics (CE) devices may be connected to a network such as the Internet to provide access to an interactive entertainment service (e.g., a video service, video-on-demand service, pay-per-view service, Internet TV service, etc.) on a server. Interactive entertainment services typically provide data and/or audio-video content such as, but not limited to, movies and television programs. However, before such data and/or audio-video content from a service can be presented on a TV or CE device, login information, authentication information, and/or associated credentials must be provided to or exchanged with the service, and even the server hosting the service, to establish an authenticated session during which information, data, and/or content may be exchanged between the TV or CE device and the service.

SUMMARY OF THE INVENTION

Present principles recognize that such information can be provided and/or exchanged automatically between the TV or CE device and the service when the service is initially accessed by the TV or CE device. Thus, a user under these circumstances is not required to manually input any information to establish a session with the service. As further recognized by the present application, after, e.g., a predefined period or a period of inactivity, the initial session can expire. Expiration of the session results in the inability to exchange information, data, and/or content between the TV or CE device and the service. Present principles understand that prompting a user to authorize and/or enter information to establish a subsequent session or reestablish the previous session to continue to exchange information, data, and/or content with the service can be confusing particularly when the user may not have logged in initially. Furthermore, if the prompt requests specific login or authentication information from the user, the user may not know the information and/or have access to it since the user was not initially required to input the information. As understood herein, the present application reduces and/or eliminates user confusion, unnecessary action on the part of the user, and the inability to establish another session or renew a previous session as described above.

Accordingly, a system includes a video display and a processor controlling the display. The processor can access computer readable instructions stored in a storage area of the TV to cause the processor to execute the actions disclosed herein. First, responsive to viewer selection of a service such as, but not limited to, an interactive entertainment service, the processor accesses a server associated with the service over a network. If desired, in some embodiments the service may be Internet TV and the network may be the Internet.

Then, without any viewer interaction, the processor executes authentication with the server. Thereafter, and responsive to successful authentication, the processor provides the service to a viewer at least in part by presenting an image associated with the service on the display. Next, responsive to a viewer selection of an asset from the service automatically and without viewer input the processor determines if a session for which the authentication is valid is expired and responsive to a determination that the session is expired, the processor automatically and without viewer input executes authentication with the server to establish a new session. In some embodiments, the server may indicate that a session for which the authentication is valid is expired only in response to a request from the processor for an asset associated with the service.

If desired, the processor may also present a message on the display informing the viewer that the session has expired and is being reestablished responsive to the server indicating that a session for which the authentication is valid has expired. The message may not contain any viewer prompt or viewer input field in some embodiments.

Also in some embodiments, the processor may receive from the server an asset list responsive to successful authentication to establish an initial session, wherein at least some assets shown on the list represent respective audio-video programs. Additionally, the processor may receive from the server an updated asset list responsive to successful authentication to establish a new, subsequent session responsive to the server indicating that a session for which the authentication is valid has expired.

In another aspect, a method includes executing authentication with a server providing a service. The method also includes receiving a token responsive to successful authentication, with the token expiring upon elapse of a session. The method then includes presenting the token to the server responsive to viewer selection of an asset affiliated with, the service. The method further includes receiving from the server the asset and presenting the asset on a video display. Last, the method includes automatically, and without viewer interaction, repeating authentication with the server after the elapse of the session to obtain a new token useful for presentation to the server to receive one or more assets affiliated with the service.

In still another aspect, a system includes a consumer electronics device having a display. The system also includes a processor on the device controlling the display and accessing computer readable instructions to cause the processor to access a server providing a service. Additionally, the instructions cause the processor to execute authentication with the server without any viewer interaction to allow access to the service. The instructions then cause the processor to present an asset associated with the service on the display. Next, responsive to the server indicating that a session for which the authentication is valid will expire, the instructions cause the processor to automatically and without viewer input re-execute authentication with the server to refresh the already established session such that the session does not lapse. It is to be understood that refreshing a session extends the session such that the moment of expiration of the session is temporally extended.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is an example user interface presenting a list of assets available through a service that includes a prompt indicating that an expired session is being automatically reestablished; and FIG. 4 is an example user interface presenting a list of assets available through a service that includes a prompt indicating that an expired session has been automatically reestablished;

FIG. 5 is an example user interface presenting a list of assets available through a service that includes a prompt indicating that the asset list is being updated; and FIG. 6 is an example user interface presenting a list of assets available through a service that includes a prompt indicating that a selected asset is being fetched from the service.

DETAILED DESCRIPTION OF THE PREFERRED EMBODIMENT

Figure 1:
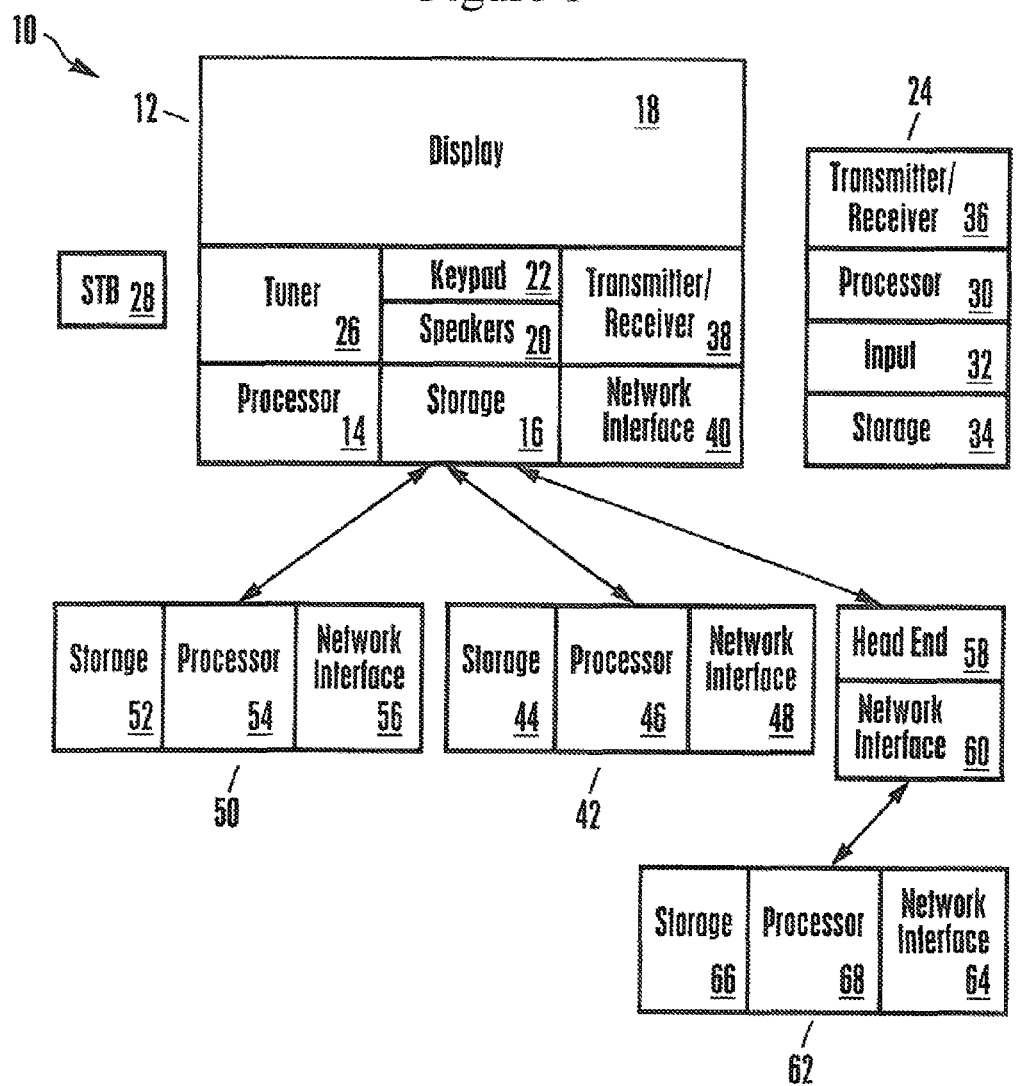
FIG. 1 is an example hardware block diagram of a system in accordance with present principles.

Referring initially to FIG. 1, an example hardware block diagram of a system generally designated 10 is shown. The system 10 includes a television (TV) 12, though it is to be understood that present principles may apply to a plurality of non-limiting consumer electronics devices. The TV 12 has a processor 14 capable of executing logic, including the logic described herein. The TV 12 also includes one or more non-transitory computer readable data storage medium(s) 16 such as, but not limited to, RAM-based storage (e.g., a chip implementing dynamic random access memory (DRAM)), flash memory, or disk-based-storage). Moreover, logic such, as the logic described herein that is executable by the processor 14 may be stored on the medium(s) 16 in accordance with present principles.

As shown in FIG. 1, the TV 12 also has one or more output devices such as a display 18 and speakers 20. It is to be understood that the output devices are capable of outputting data and/or content, such as audio and visual content, to a user. The TV 12 further includes one or more input devices capable of receiving input from a user, such as a keypad 22 and a remote commander 24. However, it is to be understood that other input devices may also be included on, or associated with, the TV 12. Furthermore, the display 18 may function as a touch-screen input device in some embodiments.

The TV 12 also includes a TV tuner 26 that may communicate with one or more content sources and/or services in accordance with present principles to output media content and/or data through the TV 12. Additionally, the TV 12 may be electrically and/or wirelessly connected to an external set-top box 28. The set-top box 28 communicates with one or more content sources and/or services in accordance with present principles to output content and/or data through the TV 12. However, it is to be understood that, in other non-limiting embodiments, only one of the tuner 26 or set-top box 28 may be included on the TV 12.

Still in reference to FIG. 1, the remote commander 24 referenced above may have a processor 30, with the processor 30 being capable of executing user commands input through an input region 32 on the remote commander 24. The input region 32 may include control keys (not shown), may employ touch-screen technology, and/or may employ voice recognition technology in non-limiting embodiments.

The remote commander 24 may also have at least one data storage medium 34, which is capable of storing media content, data, and/or other non-limiting information in accordance with present principles. For example, the data storage medium 34 may store information regarding preset channel memory corresponding to particular buttons on the remote commander 24. Additionally, the remote commander 24 may include a wireless transmitter/receiver 36 which may receive input from the processor 30 to produce an electro-magnetic wave, such as an infrared signal, which maybe received by a wireless transmitter/receiver 38 on the TV 12. Thus, it is to be understood that the transmitters/receivers 36 and 38 allow for bi-directional communication between the remote commander 24 and TV 12. As but one example, the wireless transmitter/receiver 36 may transmit user input and/or commands received at the remote commander 24 to the TV 12 to control the TV 12.

Continuing in reference to FIG. 1, the TV 12 also includes a network interface 40, such as, but not limited to, a wired or wireless modem or wireless telephony transceiver that communicates with the processor 14 to provide connectivity to a wide area network, such as, but not limited to, the Internet. However, it is to be understood that the TV 12 may be connected to any non-limiting network and capable of communication there through, such as through a cable or wireless connection to a head end 58 (described below) or a satellite uplink (not shown). Additionally, in some embodiments connectivity may be established through Wi-Fi technology and/or Ethernet technology.

Still in reference to FIG. 1, the system 10 may include one or more servers, such as the server 42 and server 50 shown in FIG. 1. In example embodiments, the server 42 may be an Internet server capable of communication with the TV 12 over a network such as the Internet in accordance with present principles. Further, the server 42 may have at least one non-transitory computer readable data storage medium 44 such as, but not limited to, RAM-based storage (e.g., a chip implementing dynamic random access memory (DRAM)), flash memory, or disk-based-storage). The storage medium 44 stores data, content, and/or information such as, but not limited to, audio-video programs such as television shows and movies, video games, and audio files such as MP3s in accordance with present principles. Note that, as used herein, the terms "data," "media content," "media files," and "content" are non-limiting terms that may refer to a plurality of electronic data types and formats.

Additionally, it is to be understood that the server 42 is capable of hosting a service that can provide assets, wherein some assets may represent audio-video programs, to the TV 12 in accordance with present principles. In non-limiting assets, the service may be Internet TV and/or an interactive entertainment service. Even further, it is to be understood that information stored on the storage medium 44 may include authentication data, settings and/or settings files such as, but not limited to, service and/or affiliation tokens, service and/or login credentials, and other non-limiting session identification information and authentication information to maintain an interactive session with the TV 12 such that a user may select assets from the server 42 for presentation on the TV 12.

Continuing in reference to FIG. 1, the server 42 also includes a processor 46 that processes requests and/or commands received from the TV 12. For example, the processor 46 provides an asset to the TV 12 responsive to a request for the asset from the TV 12. Additionally, the processor 46 transmits and/or exchanges data, authentication information, session information, and/or other credentials with the TV 12 in accordance with present principles. Further, the server 42 includes a network interface 48, such as a wired or wireless modem or wireless telephony transceiver that communicates with the processor 46 to provide connectivity to a network in accordance with present principles.

In addition to the server 42, FIG. 1 shows a second server 50. The server 50 has at least one storage medium 52, processor 54, and network interface 56. The server 50 also hosts a service that provides assets, some of which are and/or represent audio-video programs, to the TV 12. Moreover, the server 50 may provide and/or exchange data, authentication information, session information, and/or other credentials with the TV 12 in accordance with present principles.

Continuing in reference to FIG. 1, a head end 58 is also shown. The head end 58 may be a satellite or cable head end. Further, the head end 58 is understood to be in communication with the TV 12 over, e.g., a closed network, through a wired or wireless connection. Additionally, the head end 58 may include a network interface 60 such that the head end 58 may communicate with the TV 12 over a wide-area and/or open network.

Moreover, in some embodiments the head end 58 may be wired or wirelessly connected to a non-internet server 62, or may optionally be integrated with the non-internet server 62. Moreover, the server 62 may optionally have its own network interface 64 for communication over a network in accordance with present principles, and may also have at least one storage medium 66 and a processor 68.

Concluding the present description of FIG. 1, it is to be understood that the TV 12, remote commander 24, server 42, server 50, head end 58, and non-internet server 62 may include respective power supplies to provide voltage to each respective device, though the power supplies are not shown in FIG. 1 for clarity. For example, a battery or an AC/DC power supply may be included on the TV 12, remote commander 24, server 42, server 50, head end 58, and non-internet server 62.

Figure 2:
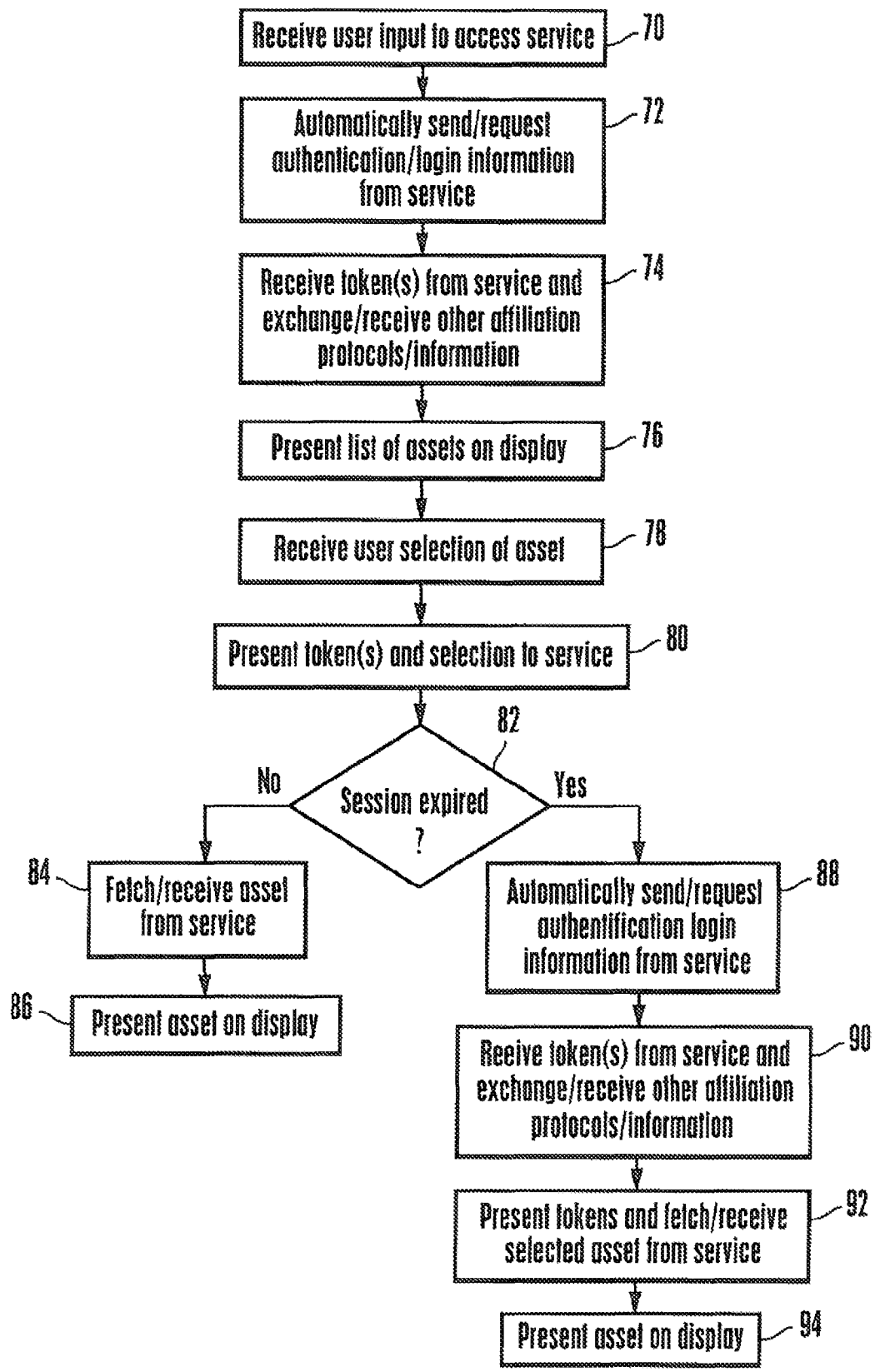
FIG. 2 is a flow chart of example logic for establishing system TV settings in accordance with present principles.

Now in reference to FIG. 2, a flow chart of example logic for automatically executing and/or repeating authentication with a server to establish a new session (or reestablish a previous session) with a service subsequent to automatic establishment of an initial session in accordance with present principles is shown. It is to be understood that "authentication repeat," as used herein, may refer to subsequent authentication with a service after expiration and/or lapse of a previous session and/or refer more specifically to the service providing new and/or renewed tokens after expiration of a session. It is to be further understood that in example embodiments, expiration and/or lapse of the session as described herein includes expiration of at least one token received from the service such as, but not limited to, expiration of a service token and/or affiliation token.

Thus, beginning at block 70, the logic receives user input to access a service over a network, such as, but not limited to, an interactive entertainment service capable of providing assets such as television shows and movies to a consumer electronics device. Then at block 72 the logic automatically and without any user interaction initiates authentication and/or logs in with the service by sending and/or requesting authentication information and/or login information from the service. It is to be understood that authentication and/or login involves the exchange and/or acquisition of non-limiting authentication and/or session parameters (including, e.g., a service token, an affiliation token, etc.).

The logic then receives at least one token from the service at block 74 during or upon, successful authentication with the service Ito thereby establish a. session. The logic may also receive, send, and/or exchange any other information, affiliation protocols, and/or credentials with the service at block 74. For example, asset information and at least one asset list associated with the assets to be presented on the consumer electronics device's display may be received, as well as menu items associated with a user interface such as the user interfaces described herein.

Then, at block 76, a list of assets affiliated with the service and representing data and/or media content, such as, but not limited to, audio-video programs, is presented on the display of the consumer electronics device. Moving to block 78, the logic receives a user's selection of an asset selected from the asset list. At block 80 the logic then presents the token to the service along with a request for the selected asset.

Thereafter, the logic determines at decision diamond 82 whether the previously established session has expired and/or whether the token(s) as described above may still be used given any lapse of the session in accordance with present principles. It is to be generally understood that an otherwise valid token may not be accepted by the service after lapse of a session during which the token was to be used. It is to be further understood that the logic makes the determination at diamond 82 only in response to the occurrence of a particular event, such as receiving user selection of another asset from the asset list, in the preferred embodiment. Alternatively, however, the logic may make the determination of diamond 82 automatically, e.g., at a predetermined time or interval.

If the logic determines at diamond 82 that the session has not expired or lapsed, the logic moves to block 84. At block 84, the current session continues and the selected asset is fetched and/or received from the service. It is to be understood herein that an asset is fetched and/or received once the token(s) presented by the logic has been accepted by the service and/or matches the token previously provided by the service at block 74 (thereby indicating that the asset request originated from a consumer electronics device authorized to access the service). After block 84, the logic then presents the selected asset on the display at block 86.

If, however, the logic determines at diamond 82 that the current session has expired, the logic instead advances to block 88. At block 88 the logic automatically and without any user interaction initiates and/or repeats authentication with the service at least in part by requesting at least one new token and/or requesting renewal of a previously received token. The logic may also send and/or request other authentication information and/or login information from the service at block 88 to establish a new session, though not required. The logic then continues to block 90, where the logic receives at least one new token from the service and/or receives at least one renewed token. The logic may also receive, send, and/or exchange other required information, affiliation protocols, and/or credentials with the service at block 90 to establish a new session. However, it is to be understood that while a new token and/or a renewed token is received at block 90, other affiliation protocols need not necessarily be exchanged at block 90 to repeat authentication after session expiration (and thereafter execute a user request and/or present a selected asset in accordance with present principles). Thus, authentication repeat may include only receipt of a new token and/or renewal of a previously received token in some embodiments Moving to block 92, the logic presents the new token(s) and/or renewed token(s) to the service and fetches and/or receives the selected asset from the service. Concluding at block 94, the logic then presents the selected asset on the consumer electronics device's display.

Now in reference to FIG. 3, an example user interface presenting a list of assets available through a service that includes a prompt indicating that an expired session is being automatically reestablished is shown, though it is to be understood that a new session may also be established upon expiration of a previous session in accordance with present principles. As shown in FIG. 3, a UI 104 is presented on the display of a consumer electronics device, such as the display 18 described above. The UI 104 includes a list 106 of thumbnails representing assets available through a service in accordance with present principles, wherein the assets may represent audio-video programs in non-limiting embodiments. Additionally, the UI 104 may optionally include a scroll bar 108 to allow a user to scroll up and down through the list of available assets. Further, the UI 104 may optionally include plural UI selector elements 110 capable of selection by a user to, e.g., view options associated with the UI 104, view details of a particular audio-video program and/or the asset list, revert to the top of the asset list, and refresh the asset list. In addition, the UI 104 may have a selector element 112 commonly known as a "back button" in some embodiments, which a user may select to revert to a previously presented user interface and/or screen.

FIG. 3 also shows a message 114 on the UI 104. The message 114 indicates that the previously established session used to present the list 106 has expired and is being reestablished. In addition to the above, a "connecting" icon 116 may also be presented on the UI 104. The icon 116 can indicate that the processor of the consumer electronics is in the process of connecting to the service and automatically reestablishing the previous session. As may be appreciated from FIG. 3, the message 114 contains no viewer prompt and no viewer input field for viewer manipulation.

Now in reference to FIG. 4, the UI 104 described above is shown again. The UI 104 still has the list 106 of thumbnails representing assets, the scroll bar 108, plural UI selector elements 110, back-button selector element 112, and connecting icon 116. In contrast to FIG. 3, a message 118 is now shown in FIG. 4. The message 118 indicates that the session has been reestablished and that the list 106 is being updated. It may be appreciated from FIG. 4 that the message 118 does not contain any viewer prompt and or viewer input field for viewer manipulation, similar to the message 114 of FIG. 3.

Moving on to FIG. 5, the UI 104 described above is shown. The UI 104 still has the list 106 of thumbnails representing assets, the scroll bar 108, plural UI selector elements 110, back-button selector element 112, and connecting icon 116. In contrast to FIGS. 3 and 4, a message 120 is shown in FIG. 5. The message 120 indicates that the asset list 106 has been updated.

Concluding the detailed description with FIG. 6, the UI 104 is again shown. The UI 104 still has the list 106 of thumbnails representing assets, the scroll bar 108, plural UI selector elements 110, back-button selector element 112, and connecting icon 116. Rather than the messages described above, a message 122 is now presented on the UI 104, as shown in FIG. 6. The message 122 indicates that a selected asset is being fetched in accordance with present principles. Thus, if a determination as to whether a session has expired was initiated by user selection of an asset from the asset list 106 (as described in reference to FIG. 2 above), the message 122 may appear to indicate that the selected asset is being fetched subsequent to the session being reestablished.

While the particular SYSTEM AND METHOD FOR AUTOMATICALLY ESTABLISHING NEW SESSION WITH INTERACTIVE SERVICE AFTER PREVIOUS SESSION EXPIRATION is herein shown and described in detail, it is to be understood that the subject matter which is encompassed by the present invention is limited only by the claims.

What is claimed is:

1. A system, comprising:
a video display;
a processor configured for controlling the display and accessing computer readable instructions to cause the processor to:
responsive to a viewer selection of a service, access, over a network, a server associated with the service;
without any viewer interaction including without user manual input of any further information to establish a session with the service, execute authentication with the server;
responsive to successful authentication, provide the service to said viewer at least in part by presenting an image associated with the service on the display; and
responsive to said viewer selection of an asset from the service, automatically and without viewer input determine whether a session for which the authentication is valid is expired and responsive to the determination that the session is expired, repeating authentication with the server to establish a new session, responsive to the server indicating that the session for which the authentication is valid is expired, further presents a message on the display informing the viewer that the session has expired and is being reestablished, wherein responsive to successful authentication repeat to establish a new session responsive to the server indicating that the session for which the authentication is valid is expired, the processor receives from the server an updated asset list, at least some assets representing respective audio video programs.

2. The system of claim 1, wherein the message contains no viewer prompt and no viewer input field.

3. The system of claim 1, wherein the service is Internet TV.

4. The system of claim 1, wherein the network is Internet.

5. The system of claim 1, wherein the server indicates that the session for which the authentication is valid is expired only in response to a request from the processor for an asset associated with the service.

6. A method, comprising:
executing authentication with a server providing a service;
receiving a token responsive to successful authentication, the token expiring upon elapse of a session;
responsive to viewer selection of an asset affiliated with the service, presenting the token to the server;
receiving from the server the asset; presenting the asset on a video display;
automatically and without viewer interaction repeating authentication with the server after the elapse of the session to obtain a new token useful for presentation to the server to receive one or more assets affiliated with the service; and
responsive to successful authentication repeat, receiving from the server an updated list of assets affiliated with the service, wherein responsive to the successful authentication repeat to establish a new session responsive to the server indicating that the session for which the authentication is valid is expired, the method includes receiving from the server an updated asset list, at least some assets representing respective audio video programs.

7. The method of claim 6, further comprising responsive to the elapse of the session, presenting a message on the video display informing the viewer that the session has expired and the authentication is being repeated.

8. The method of claim 7, wherein the message contains no viewer prompt and no viewer input field.

9. The method of claim 6, wherein at least one of the assets affiliated with the service represents a respective audio video program.

10. The method of claim 6, further comprising upon authentication with the server and receiving the token responsive to said successful authentication, presenting a list of available assets affiliated with the service selectable by a user on the video display.

11. The method of claim 6, wherein the authentication is repeated after the elapse of the session only in response to a request for the asset affiliated with the service.

12. A system, comprising:
a consumer electronic device having a display;
a processor on the device and configured for controlling the display and configured for accessing computer readable instructions to cause the processor to:
access a server providing a service;
execute authentication with the server without any viewer interaction to allow access to the service;
present an asset associated with the service on the display; and
responsive to the server indicating that a session for which the authentication is valid will expire, automatically and without viewer input re-execute authentication with the server to refresh the session such that the session does not lapse, wherein responsive to successful session refresh, the processor receives from the server an updated asset list, at least some assets representing respective audio video programs.

13. The system of claim 12, wherein the asset is presented on the display responsive to the asset being selected using a selector element that represents the asset on an interface associated with the service and presented on the display.

14. The system of claim 13, wherein responsive to the server indicating that a session for which the authentication is valid will expire, the processor further presents a message on the display indicating that the session will expire and that the session is being refreshed.

15. The system of claim 13, wherein a session is refreshed such that the moment of expiration of the session is temporally extended.

16. The system of claim 13, wherein the asset is selected from an asset list that is presented on the video display.

* * * * *